United States Patent
Yazawa et al.

(10) Patent No.: US 9,636,821 B2
(45) Date of Patent: May 2, 2017

(54) INDUSTRIAL ROBOT

(71) Applicant: NIDEC SANKYO CORPORATION, Nagano (JP)

(72) Inventors: Takayuki Yazawa, Nagano (JP); Yutaka Yoshizawa, Nagano (JP); Masashi Fujiwara, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 14/347,858

(22) PCT Filed: Dec. 13, 2012

(86) PCT No.: PCT/JP2012/082278
§ 371 (c)(1),
(2) Date: Mar. 27, 2014

(87) PCT Pub. No.: WO2013/103078
PCT Pub. Date: Jul. 11, 2013

(65) Prior Publication Data
US 2014/0318300 A1    Oct. 30, 2014

(30) Foreign Application Priority Data
Jan. 6, 2012    (JP) .................. 2012-001380

(51) Int. Cl.
*B25J 17/02* (2006.01)
*B25J 9/00* (2006.01)

(52) U.S. Cl.
CPC ......... *B25J 9/0051* (2013.01); *B25J 17/0216* (2013.01); *B25J 17/0258* (2013.01); *B25J 17/0266* (2013.01); *Y10T 74/20329* (2015.01)

(58) Field of Classification Search
CPC .................. B25J 17/0258; B25J 17/0266
(Continued)

(56) References Cited

U.S. PATENT DOCUMENTS

2007/0211978 A1*  9/2007  Engesser ................. F16C 33/78
                                                      384/517
2010/0170361 A1*  7/2010  Bennett ............ A61B 17/32002
                                                      74/490.04

FOREIGN PATENT DOCUMENTS

JP    2000326272 A    11/2000
JP    2002531778 A     9/2002
(Continued)

OTHER PUBLICATIONS

International Search Report for International Application No. PCT/JP2012/082278, date of mailing Mar. 5, 2013 with English translation.

*Primary Examiner* — William Kelleher
*Assistant Examiner* — Randell J Krug
(74) *Attorney, Agent, or Firm* — Cantor Colburn LLP

(57) ABSTRACT

An industrial robot may include a main body part; a plurality of levers having base end sides turnably connected with the main body part; a plurality of arm parts having respective base end sides turnably connected with respective tip end sides of the plurality of the levers; a movable part which is turnably connected with the respective tip end sides of the plurality of the arm parts; and a plurality of turning drive mechanisms for respectively turning the plurality of the levers. The plurality of the levers may radially extend to an outer peripheral side of the main body part at a substantially equal pitch. The arm part may provided with two arms which are mutually parallel to each other and are formed in a straight shape.

5 Claims, 10 Drawing Sheets

(58) Field of Classification Search
USPC .......................... 901/28; 74/490.05; 384/517
See application file for complete search history.

(56) References Cited

FOREIGN PATENT DOCUMENTS

| | | | |
|---|---|---|---|
| JP | 2004066385 A | * | 3/2004 |
| JP | 2011093075 A | | 5/2011 |
| WO | 00/32363 A1 | | 6/2000 |

* cited by examiner

INDUSTRIAL ROBOT

CROSS REFERENCE TO RELATED APPLICATIONS

This is the U.S. national stage of application No. PCT/JP2012/082278, filed on Dec. 13, 2012. Priority under 35 U.S.C. §119(a) and 35 U.S.C. §365(b) is claimed from Japanese Application No. 2012-001380, filed Jan. 6, 2012, the disclosure of which is also incorporated herein by reference.

FIELD OF THE INVENTION

The present invention relates to a so-called parallel link type industrial robot.

BACKGROUND

Conventionally, a so-called parallel link type industrial robot has been known as an industrial robot for conveying a work such as an electronic component (see, for example, Patent Literature 1). The industrial robot described in Patent Literature 1 includes a main body part, three levers which are turnably connected with the main body part, three sets of parallel links which are respectively connected with three levers, and a movable part connected with three sets of the parallel links. The three levers are connected with the main body part so as to extend substantially radially at a pitch of 120° toward an outer peripheral side of the main body part and a drive mechanism for turning the lever is connected with each of the three levers. The movable part is, for example, provided with a holding mechanism for holding a work.

In a connecting part of the main body part with the lever in the industrial robot, the lever is connected with the main body part so that the lever is capable of turning relative to the main body part with a direction substantially perpendicular to the direction where the lever is extended from the main body part as an axial direction of the turning. In a connecting part of the lever with the parallel links, the lever and the parallel links are connected with each other by a three-axes ball socket joint structured of a ball for a joint and a joint socket which is formed with a recessed part where the ball is accommodated. Further, in a connecting part of the parallel links with the movable part, similarly to the connecting part of the lever with the parallel links, the parallel links and the movable part are connected with each other by a three-axes ball socket joint. A tension coil spring for urging the recessed part of the joint socket toward the ball is disposed between the parallel links in the connecting part of the lever with the parallel links and in the connecting part of the parallel links with the movable part.

The industrial robot described in Patent Literature 1 which is structured as described above is capable of holding a work disposed at an arbitrary position by the movable part and conveying in an arbitrary direction, i.e., an upper and lower direction, a front and rear direction and/or a right and left direction in a predetermined area.

PATENT LITERATURE

[PTL 1] Japanese translation of PCT international application No. 2002-531778

In the industrial robot described in Patent Literature 1, a three-axes ball socket joint is used in the connecting part of the lever with the parallel links and in the connecting part of the parallel links with the movable part and turning of the parallel links relative to the lever and turning of the movable part relative to the parallel links are capable of being performed by the recessed part of the joint socket and the ball contacting with the recessed part. Therefore, in the industrial robot, when accuracy such as dimensional accuracy of the ball and the recessed part is not enhanced, accuracy of a relative position of the movable part for holding a work relative to the main body part is lowered. On the other hand, when accuracy of the ball and the recessed part is enhanced, a manufacturing cost of the three-axes ball socket joint is increased and, as a result, a manufacturing cost of the industrial robot is increased.

SUMMARY

In view of the problem described above, at least an embodiment of the present invention provides an industrial robot which is capable of reducing its cost while securing a relative positional accuracy of the movable part relative to the main body part.

In order to attain the above, at least an embodiment of the present invention provides an industrial robot including a main body part, a plurality of levers whose base end sides are turnably connected with the main body part, a plurality of arm parts whose respective base end sides are turnably connected with respective tip end sides of the plurality of the levers, a movable part which is turnably connected with the respective tip end sides of the plurality of the arm parts, and a plurality of turning drive mechanisms for respectively turning a plurality of the levers. The plurality of the levers is connected with the main body part so as to substantially radially extend to an outer peripheral side of the main body part at a pitch of substantially equal angle, and the arm part is provided with two arms which are mutually parallel to each other and are formed in a straight shape. Respective base end sides of the two arms are turnably connected with the tip end side of the lever, and the movable part is turnably connected with the tip end sides of the two arms. In a first joint part which is a connection part of the main body part with the lever, the base end side of the lever is connected with the main body part so that the lever is capable of turning relative to the main body part with a first direction substantially perpendicular to an extending direction of the lever from the main body part as an axial direction of turning. A second joint part which is a connection part of the lever with the arm includes a first rolling bearing, which enables turning of the arm relative to the lever with the first direction as an axial direction of turning, and a second rolling bearing which enables turning of the arm relative to the lever with a second direction substantially perpendicular to a length direction of the arm and the first direction as an axial direction of turning. A third joint part which is a connection part of the arm with the movable part includes a third rolling bearing, which enables turning of the movable part relative to the arm with the first direction as an axial direction of turning, and a fourth rolling bearing which enables turning of the movable part relative to the arm with the second direction as an axial direction of turning.

In the industrial robot in accordance with at least an embodiment of the present invention, the second joint part which is a connection part of the lever with the arm includes a first rolling bearing, which enables turning of the arm relative to the lever with the first direction as an axial direction of turning, and a second rolling bearing which enables turning of the arm relative to the lever with the second direction substantially perpendicular to a length direction of the arm and the first direction as an axial direction of turning. Further, the third joint part which is a connection part of the arm with the movable part includes a third rolling bearing, which enables turning of the movable part relative to the arm with the first direction as an axial direction of turning, and a fourth rolling bearing which enables turning of the movable part relative to the arm with the second direction as an axial direction of turning.

Therefore, according to at least an embodiment of the present invention, a relative positional accuracy of the movable part relative to the main body part can be secured by using the first through the fourth rolling bearings which are a general-purpose component and whose accuracy such as dimensional accuracy is easily secured. In other words, according to at least an embodiment of the present invention, a cost of the industrial robot can be reduced while securing a relative positional accuracy of the movable part relative to the main body part. Further, in at least an embodiment of the present invention, a tension coil spring is not required to dispose in the second joint part and the third joint part like the industrial robot described in Patent Literature 1 and thus the weights of the second joint part and the third joint part can be reduced. Further, in the industrial robot described in Patent Literature 1, the recessed part of a joint socket and a ball are contacted with each other and thus wears of the joint socket and the ball lead to a problem. However, according to at least an embodiment of the present invention, the first through the fourth rolling bearings are used and thus this problem does not occur.

In at least an embodiment of the present invention, for example, the second joint part includes a first shaft member, which is fixed to the lever and to which an inner ring of the first rolling bearing is fixed, and a second shaft member to which an outer ring of the first rolling bearing and an inner ring of the second rolling bearing are fixed, and an outer ring of the second rolling bearing is fixed to the arm. Further, in at least an embodiment of the present invention, it may be structured that the second joint part includes a first shaft member, which is fixed to the lever and to which an inner ring of the second rolling bearing is fixed, and a second shaft member to which an outer ring of the second rolling bearing and an inner ring of the first rolling bearing are fixed, and an outer ring of the first rolling bearing is fixed to the arm.

In at least an embodiment of the present invention, it is preferable that the second joint part includes a first urging member which urges the inner ring or the outer ring of the first rolling bearing toward one side in the first direction to prevent rattling between the inner ring and the outer ring of the first rolling bearing, and a second urging member which urges the inner ring or the outer ring of the second rolling bearing toward one side in the second direction to prevent rattling between the inner ring and the outer ring of the second rolling bearing. According to this structure, rattling between the inner ring and the outer ring of the first rolling bearing, and rattling between the inner ring and the outer ring of the second rolling bearing are prevented to enhance relative positional accuracy of the movable part relative to the main body part.

In at least an embodiment of the present invention, it is preferable that the first urging member and the second urging member are a disc spring. According to this structure, in comparison with a case that the first urging member and the second urging member are a plate spring or a compression coil spring, the size of the second joint part can be reduced.

In at least an embodiment of the present invention, for example, the third joint part includes a third shaft member, which is fixed to the movable part and to which an inner ring of the third rolling bearing is fixed, and a fourth shaft member to which an outer ring of the third rolling bearing and an inner ring of the fourth rolling bearing are fixed, and an outer ring of the fourth rolling bearing is fixed to the arm. Further, in at least an embodiment of the present invention, it may be structured that the third joint part includes a third shaft member, which is fixed to the movable part and to which an inner ring of the fourth rolling bearing is fixed, and a fourth shaft member to which an outer ring of the fourth rolling bearing and an inner ring of the third rolling bearing are fixed, and an outer ring of the third rolling bearing is fixed to the arm.

In at least an embodiment of the present invention, it is preferable that the third joint part includes a third urging member which urges the inner ring or the outer ring of the third rolling bearing toward one side in the first direction to prevent rattling between the inner ring and the outer ring of the third rolling bearing, and a fourth urging member which urges the inner ring or the outer ring of the fourth rolling bearing toward one side in the second direction to prevent rattling between the inner ring and the outer ring of the fourth rolling bearing. According to this structure, rattling between the inner ring and the outer ring of the third rolling bearing, and rattling between the inner ring and the outer ring of the fourth rolling bearing are prevented to enhance relative positional accuracy of the movable part relative to the main body part.

In at least an embodiment of the present invention, it is preferable that the third urging member and the fourth urging member are a disc spring. According to this structure, in comparison with a case that the third urging member and the fourth urging member are a plate spring or a compression coil spring, the size of the third joint part can be reduced.

In at least an embodiment of the present invention, it is preferable that the first rolling bearing, the second rolling bearing, the third rolling bearing and the fourth rolling bearing are a ball bearing. The ball bearing is capable of receiving a load in a radial direction and a load in a thrust direction and thus, according to this structure, two kinds of a bearing, i.e., a radial bearing and a thrust bearing are not required to be used as the first rolling bearing, the second rolling bearing, the third rolling bearing and the fourth rolling bearing. Therefore, the structures of the second joint part and the third joint part are simplified and the sizes and the weights of the second joint part and the third joint part can be reduced. Further, a cost of the industrial robot can be further reduced.

In at least an embodiment of the present invention, the industrial robot is, for example, provided with three levers and three arm parts. In a parallel link type industrial robot provided with three levers and three arm parts, for example, in comparison with a parallel link type industrial robot including four levers and four arm parts, a range of a turning angle of the arm relative to the lever and a range of a turning angle of the movable part relative to the arm become larger. However, according to at least an embodiment of the present invention, since the first through the fourth rolling bearings and the first through the fourth shaft members are used, a range of a turning angle of the arm relative to the lever and a range of a turning angle of the movable part relative to the arm can be secured.

As described above, in the industrial robot in accordance with at least an embodiment of the present invention, its cost can be reduced while securing relative positional accuracy of the movable part relative to the main body part.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

An embodiment of the present invention will be described below with reference to the accompanying drawings.
(Schematic Structure of Industrial Robot)

Figure 1:
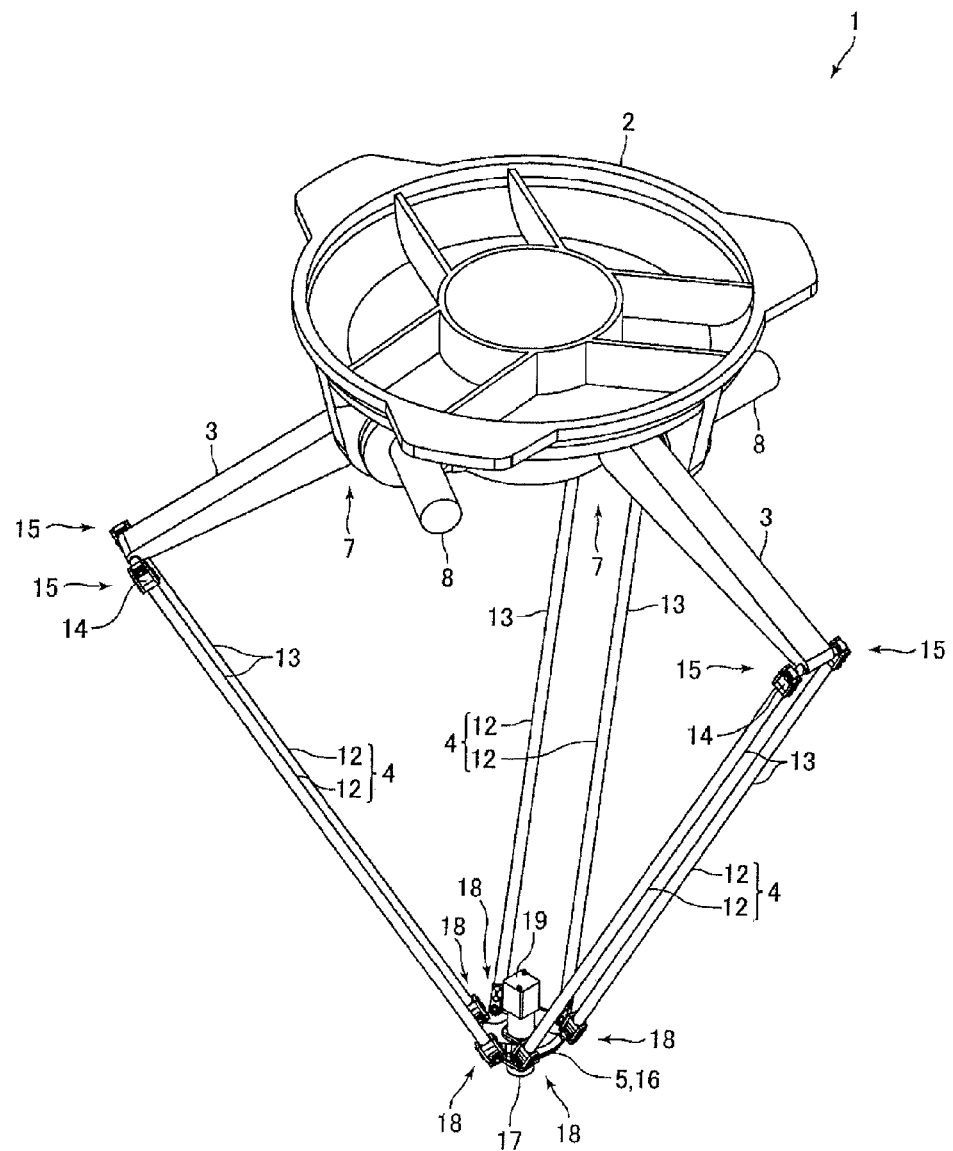
FIG. 1 is a perspective view showing an industrial robot in accordance with an embodiment of the present invention.
Figure 2:
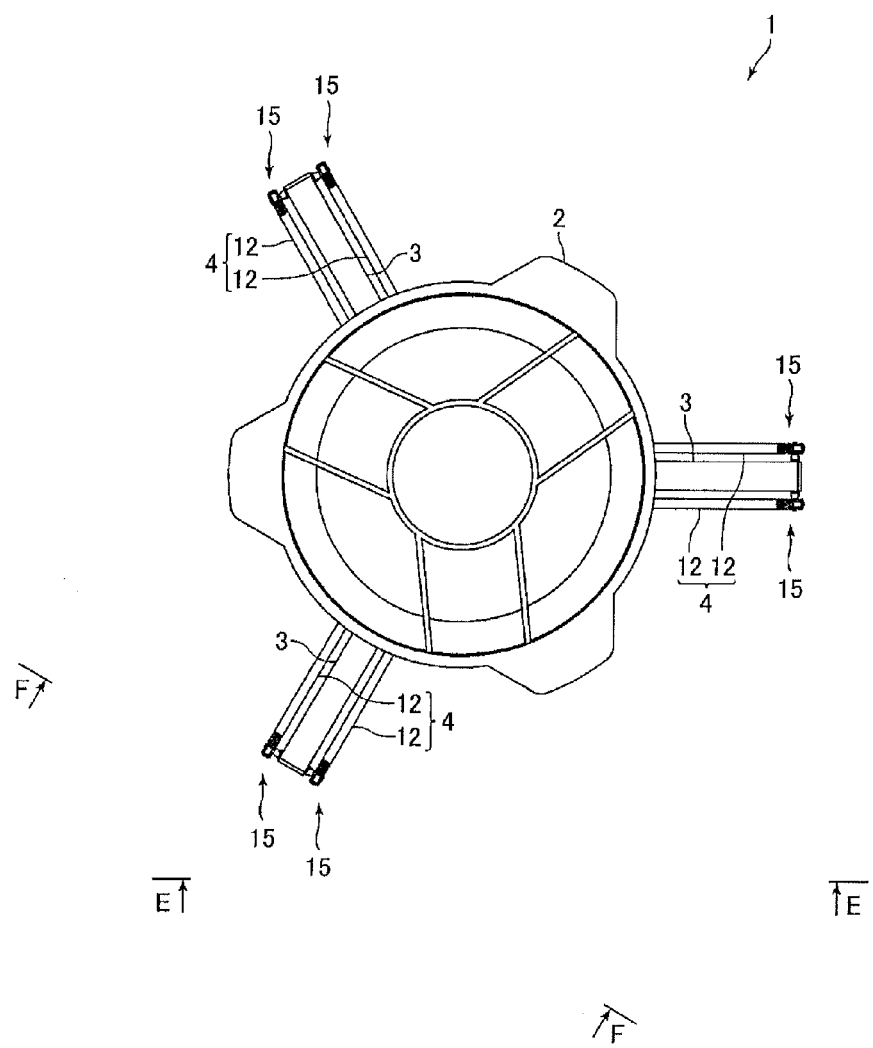
FIG. 2 is a plan view showing the industrial robot in FIG. 1.
Figure 3:
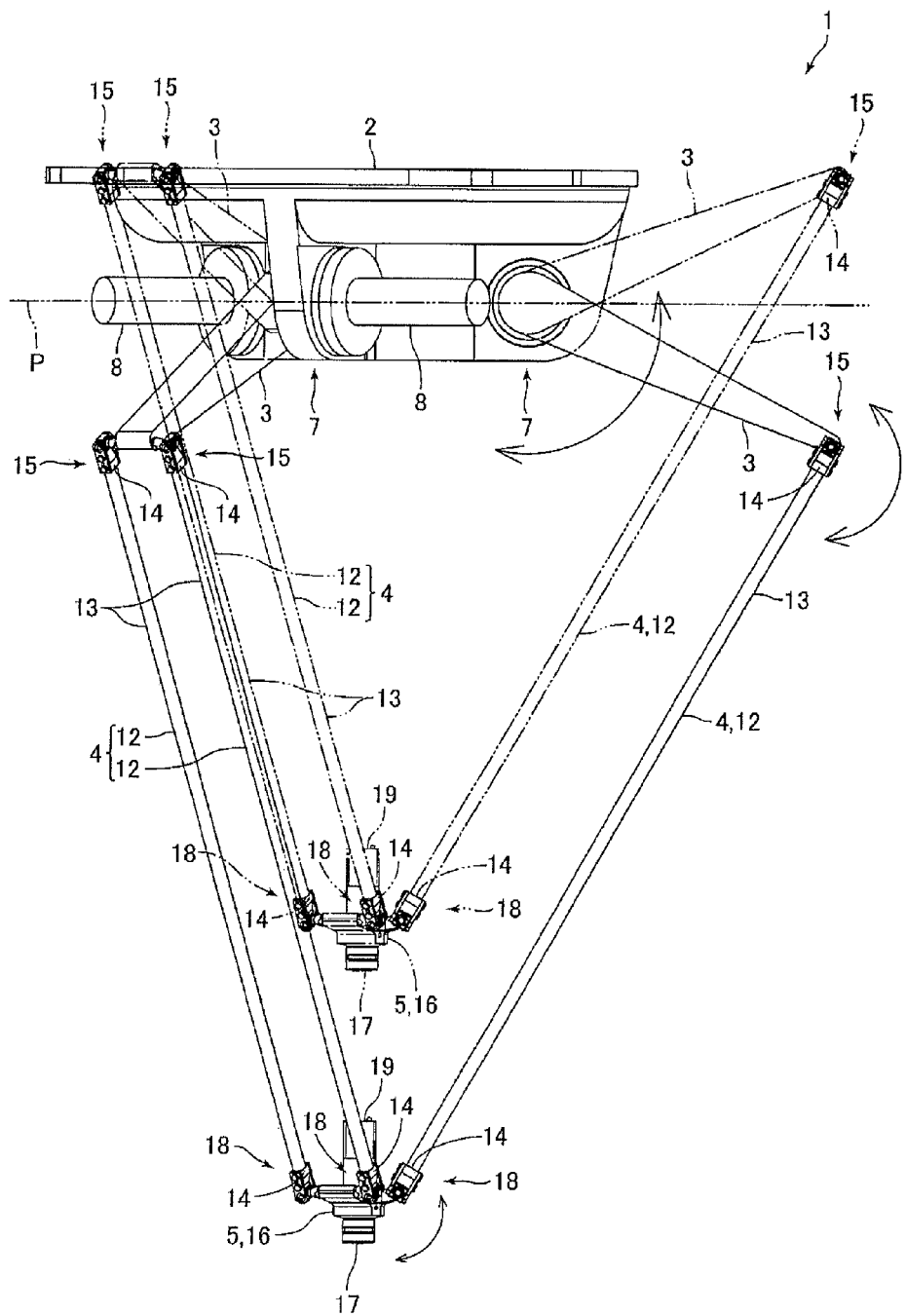
FIG. 3 is a side view showing the industrial robot which is viewed in the "E-E" direction in FIG. 2.
Figure 4:
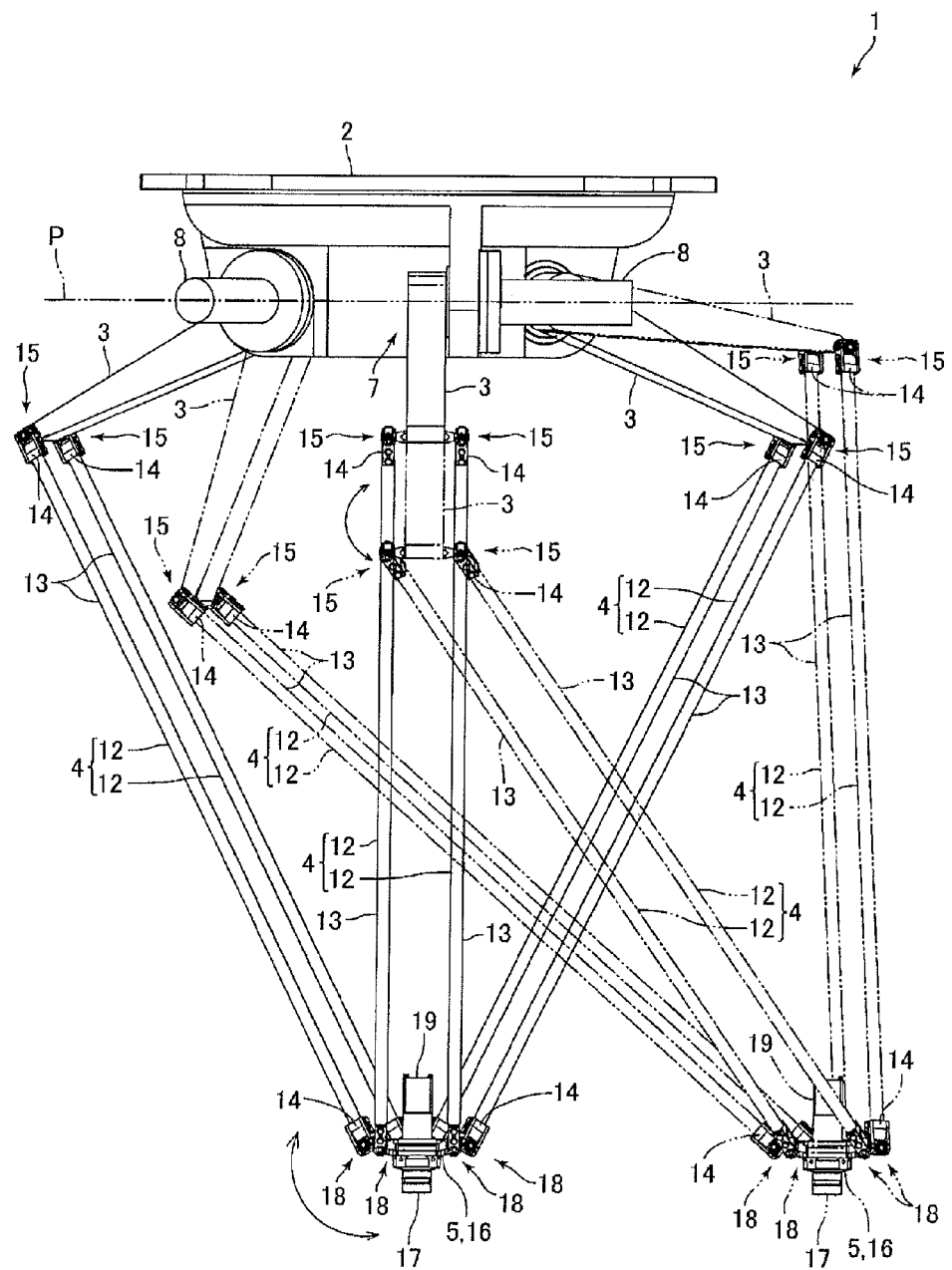
FIG. 4 is a side view showing the industrial robot which is viewed in the "F-F" direction in FIG. 2.
Figure 5:
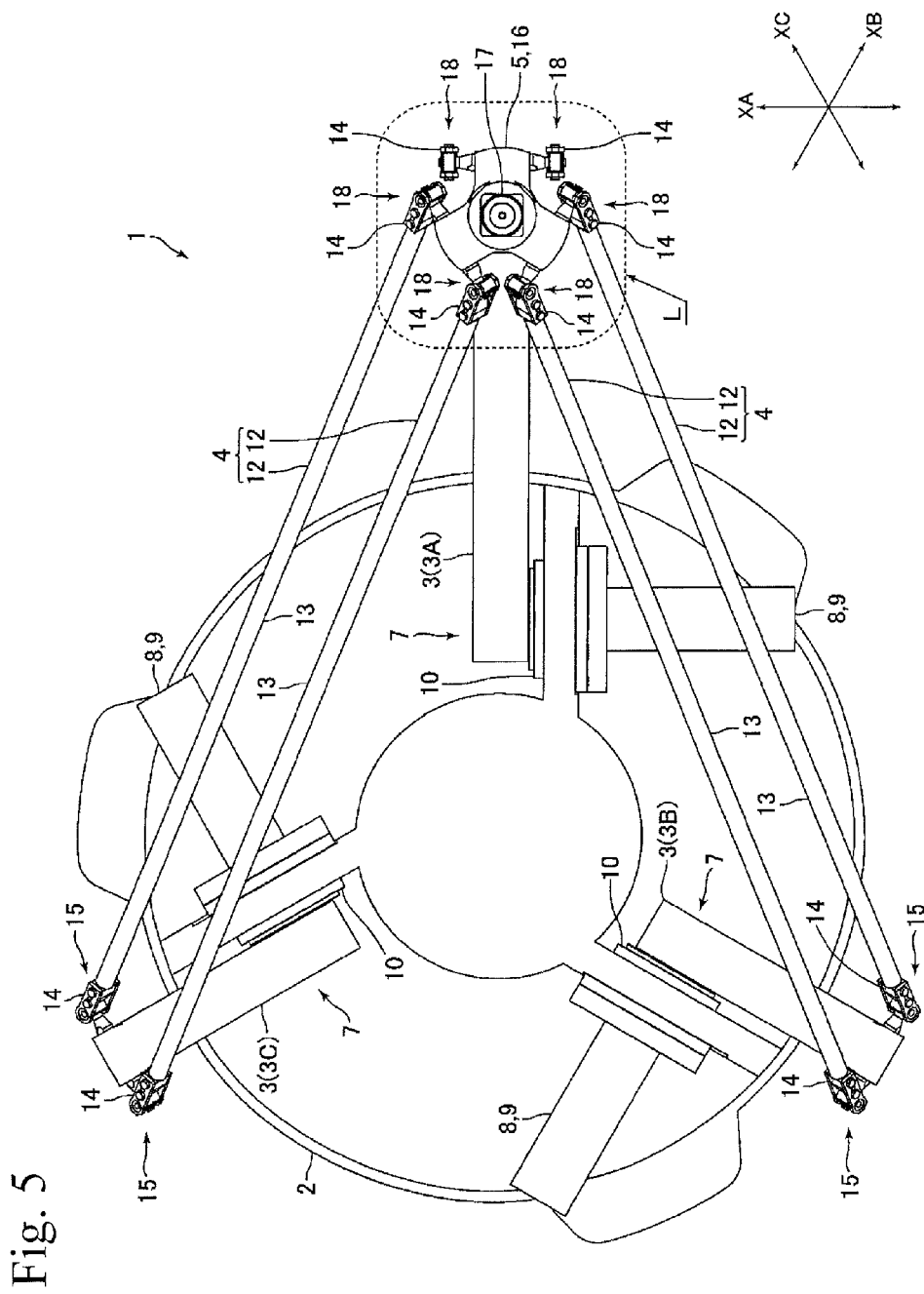
FIG. 5 is a bottom view showing the industrial robot in FIG. 1.
Figure 6:
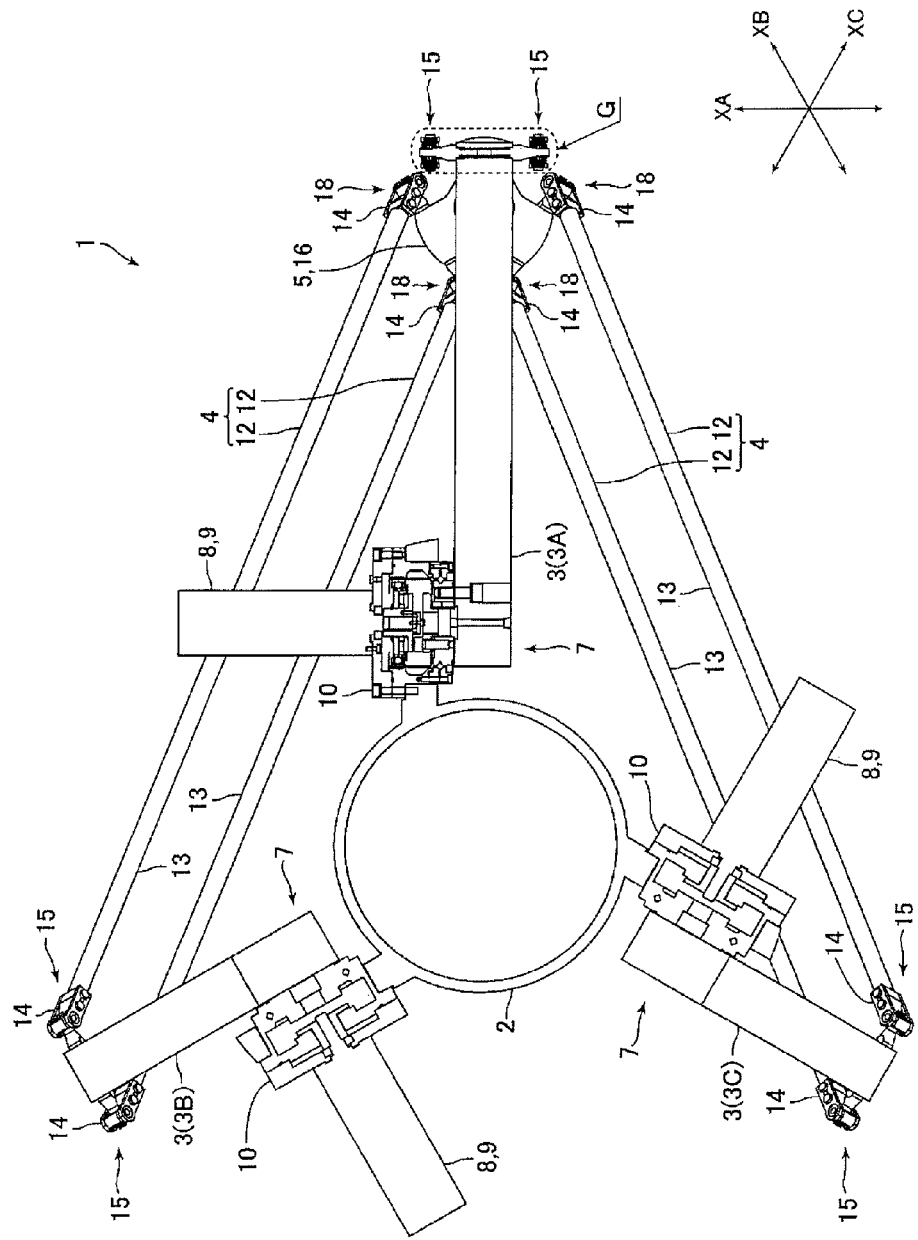
FIG. 6 is a plan view for explaining a part of the industrial robot shown in FIG. 1.

FIG. 1 is a perspective view showing an industrial robot 1 in accordance with an embodiment of the present invention. FIG. 2 is a plan view showing the industrial robot 1 in FIG. 1. FIG. 3 is a side view showing the industrial robot 1 which is viewed in the "E-E" direction in FIG. 2. FIG. 4 is a side view showing the industrial robot 1 which is viewed in the "F-F" direction in FIG. 2. FIG. 5 is a bottom view showing the industrial robot 1 in FIG. 1. FIG. 6 is a plan view for explaining a part of the industrial robot 1 shown in FIG. 1.

An industrial robot 1 in this embodiment is a so-called parallel link type industrial robot. Further, the industrial robot 1 in this embodiment is, for example, a robot for conveying a work such as an electronic component. The industrial robot 1 includes a main body part 2, three levers 3 connected with the main body part 2, three arm parts 4 respectively connected with the three levers 3, and a head unit 5 as a movable part which is connected with the three arm parts 4. In the following description, the industrial robot 1 is referred to as a "robot 1".

The three levers 3 are, as shown in FIG. 2, connected with the main body part 2 so as to substantially radially extend to an outer peripheral side of the main body part 2 at a pitch of substantially equal angle. In other words, the three levers 3 are connected with the main body part 2 so as to extend substantially radially at a pitch of 120° toward an outer peripheral side of the main body part 2. Further, base end sides of the three levers 3 are turnably connected with the main body part 2. Specifically, in a first joint part 7 which is a connection part of the main body part 2 with the lever 3, the base end side of the lever 3 is connected with the main body part 2 so that the lever 3 is capable of turning relative to the main body part 2 with a first direction, which is substantially perpendicular to an extending direction of the lever 3 from the main body part 2 (in other words, a longitudinal direction of the lever 3), as an axial direction of the turning. In other words, in the first joint part 7, the base end side of the lever 3 is connected with the main body part 2 so that the lever 3 is capable of turning with a predetermined horizontal direction in FIGS. 3 and 4 (in other words, in a predetermined direction in the plane "P" described below) as an axial direction of the turning.

As shown in FIGS. 5 and 6, when the three levers 3 are respectively referred to as a "lever 3A", a "lever 3B" and a "lever 3C" and, when a first direction substantially perpendicular to a longitudinal direction of the lever 3A is referred to as a "first direction XA", a first direction substantially perpendicular to a longitudinal direction of the lever 3B is referred to as a "first direction XB", and a first direction substantially perpendicular to a longitudinal direction of the lever 3C is referred to as a "first direction XC", the first direction XA, the first direction XB and the first direction XC are disposed on the same plane "P" (see FIGS. 3 and 4). Further, the first direction XB is inclined at substantially 60° relative to the first direction XA, the first direction XC is inclined at substantially 60° relative to the first direction XB, and the first direction XA is inclined at substantially 60° relative to the first direction XC.

A motor 8 having a speed reducer is disposed in the first joint part 7 as a turning drive mechanism for turning the lever 3. The robot 1 in this embodiment includes three motors 8 for respectively turning the three levers 3. The motor 8 is, as shown in FIGS. 5 and 6, provided with a motor main body 9 and a speed reducer 10 which is connected with the motor main body 9. An output shaft of the motor 8 is fixed to the base end side of the lever 3.

A base end side of the arm part 4 is turnably connected with a tip end side of the lever 3. Specifically, the arm part 4 is provided with two mutually parallel straight-shaped arms 12 and respective base end sides of the two arms 12 are turnably connected with the tip end side of the lever 3. The base end sides of the arms 12 are disposed on both sides in the first direction on the tip end side of the lever 3. The arm 12 is structured of an arm main body 13 made of a long and thin cylindrical shaped carbon pipe and two arm end parts 14 which are fixed to both ends of the arm main body 13. A connecting part of the lever 3 with the arm 12 is structured as a second joint part 15. A specific structure of the second joint part 15 will be described below. In this embodiment, the arm main body 13 is formed of a carbon pipe for reducing its weight. However, the arm main body 13 may be formed of a metal pipe which is formed of metal such as aluminum alloy.

The head unit 5 includes a unit main body 16 and an attaching part 17 to which a holding mechanism (not shown) for holding a work is attached. The unit main body 16 is turnably connected with the tip end sides of the three arm parts 4. In other words, the unit main body 16 is turnably connected with the tip end sides of the six arms 12. A connecting part of the arm 12 with the head unit 5 is structured as a third joint part 18. A specific structure of the third joint part 18 will be described below.

A motor 19 is fixed to the unit main body 16. The motor 19 is connected with the attaching part 17. The attaching part 17 is capable of turning with a direction perpendicular to a paper face of FIG. 5 (upper and lower direction in FIGS. 3 and 4) as an axial direction of the turning by power of the motor 19.

In the robot 1 structured as described above, when the three motors 8 are individually driven, the head unit 5 can be moved in a predetermined area to an arbitrary position in the upper and lower direction, the right and left direction and the direction perpendicular to the paper face of FIGS. 3 and 4 in a state that the head unit 5 is maintained in a constant attitude (specifically, in a state that the attaching part 17 is faced to a lower direction in FIGS. 3 and 4).

(Structure of Second Joint Part and Structure of Third Joint Part)

Figure 7:
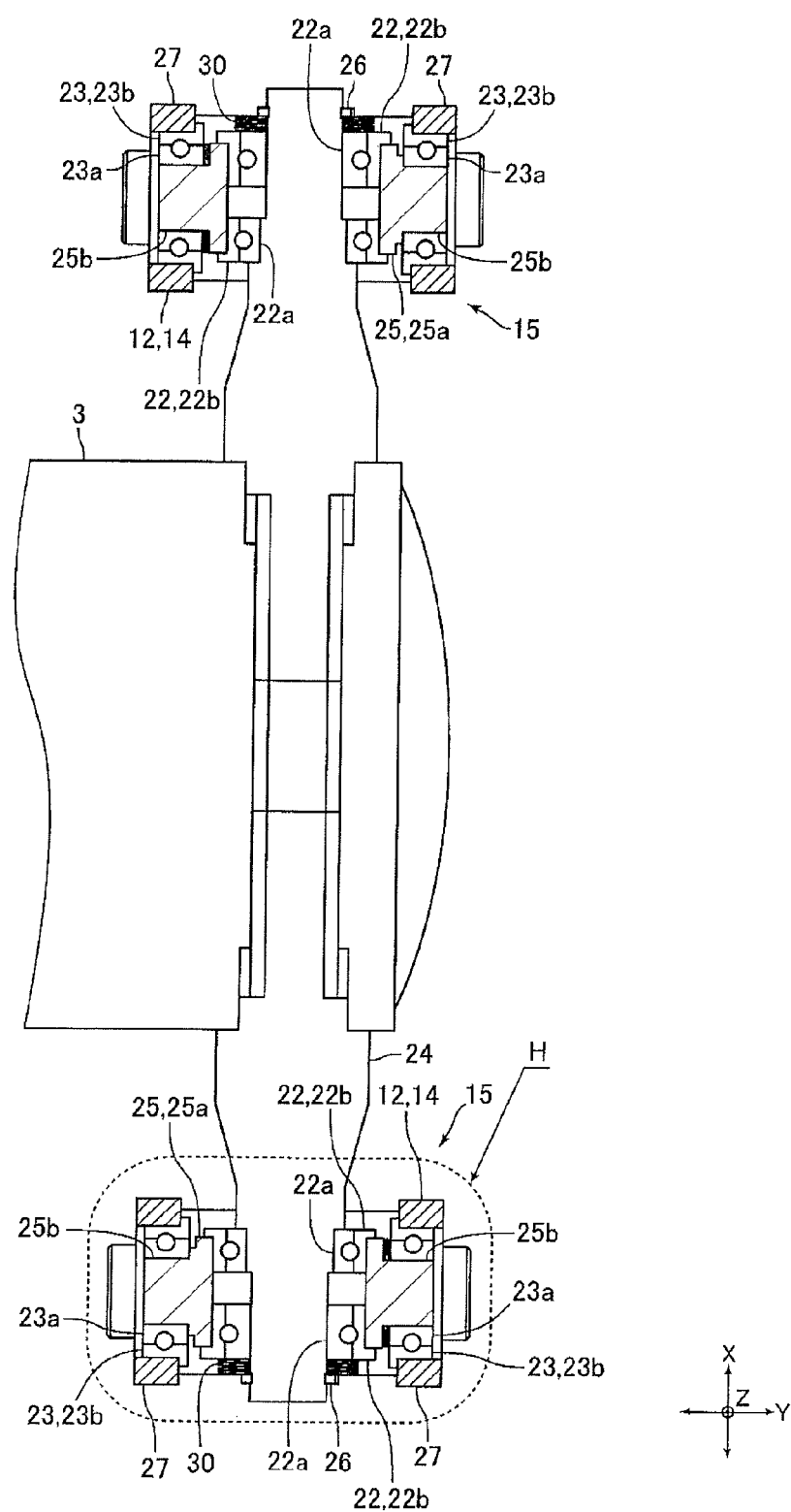
FIG. 7 is an enlarged view for explaining a structure of the "G" part in FIG. 6.
Figure 8:
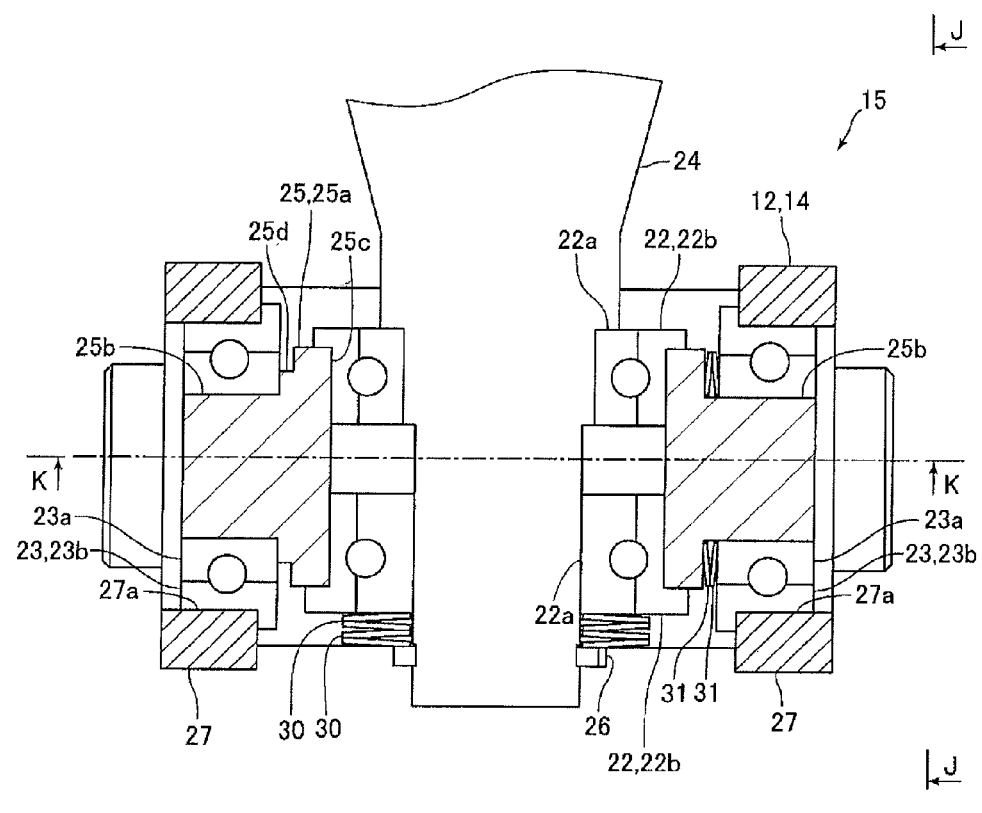
FIG. 8 is an enlarged view showing the "H" part in FIG. 7.
Figure 9A:
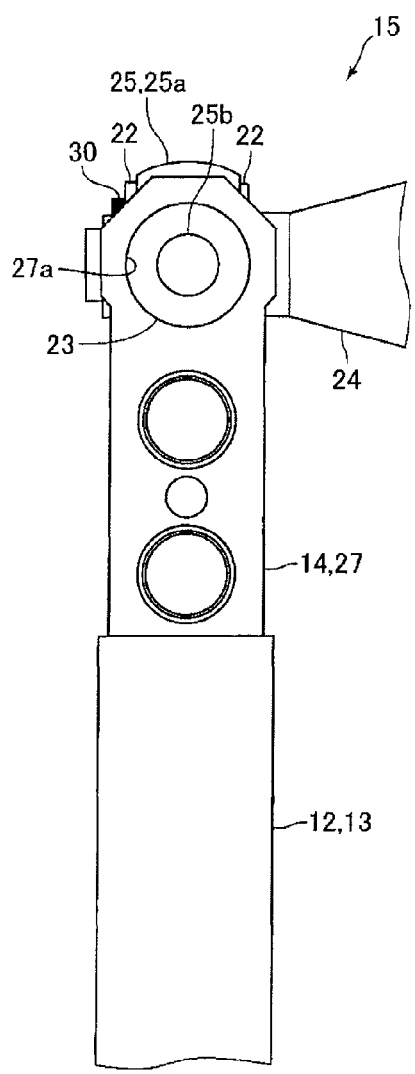
FIG. 9(A) is a side view showing a second joint part which is viewed in the "J-J" direction in FIG. 8
Figure 9B:
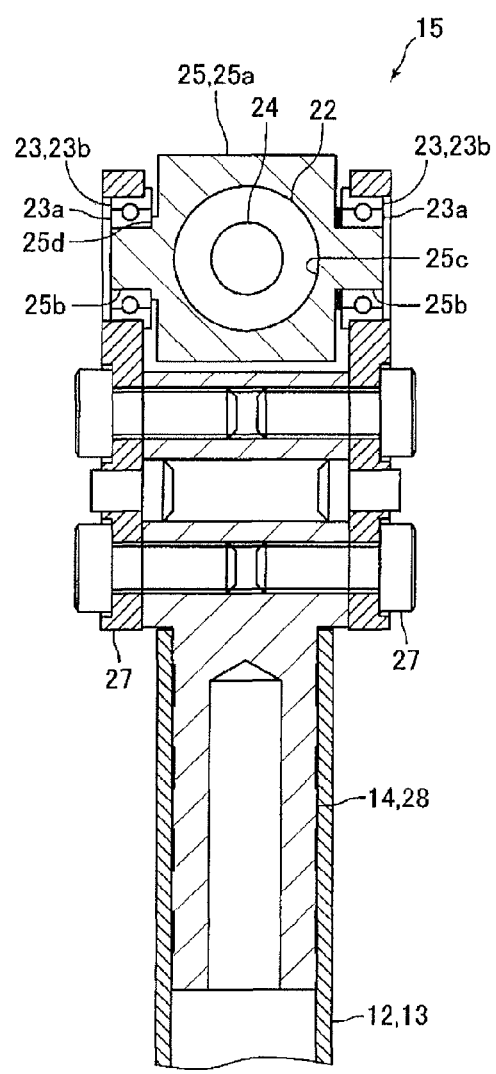
FIG. 9(B) is a cross-sectional view of the "K-K" cross section in FIG. 8.
Figure 10:
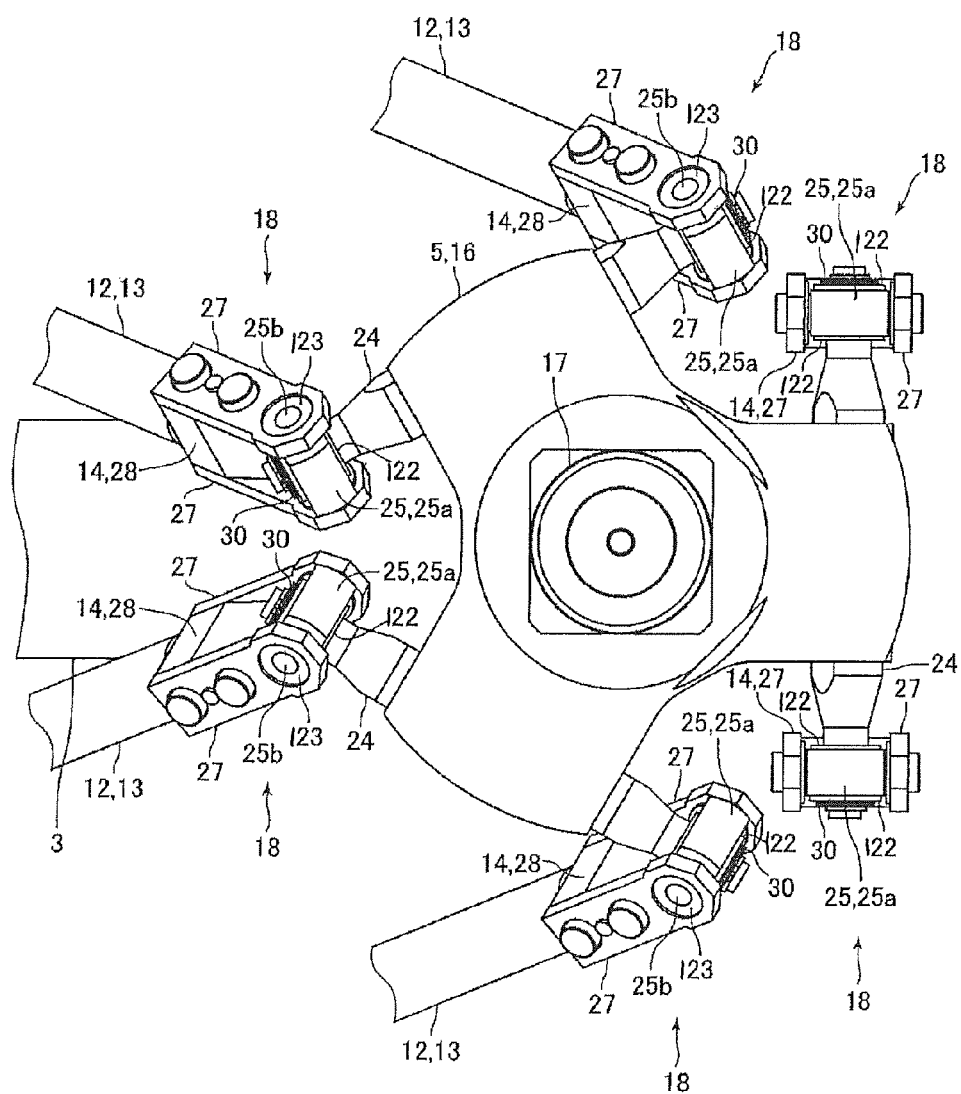
FIG. 10 is an enlarged view showing the "L" part in FIG. 5.

FIG. 7 is an enlarged view for explaining a structure of the "G" part in FIG. 6. FIG. 8 is an enlarged view showing the "H" part in FIG. 7. FIG. 9(A) is a side view showing the second joint part 15 which is viewed in the "J-J" direction in FIG. 8 and FIG. 9(B) is a cross-sectional view of the "K-K" cross section in FIG. 8. FIG. 10 is an enlarged view showing the "L" part in FIG. 5.

When a direction substantially perpendicular to a length direction of the straight-shaped arm 12 and the above-mentioned first direction is referred to as a second direction, the second joint part 15 includes two ball bearings 22 as a first rolling bearing, which enable turning of the arm 12 relative to the lever 3 with the first direction as an axial direction of the turning, and two ball bearings 23 as a second rolling bearing, which enable turning of the arm 12 relative to the lever 3 with the second direction as an axial direction of the turning. The ball bearings 22 and 23 in this embodiment are a deep groove ball bearing. Further, the second joint part 15 includes a shaft member 24 as a first shaft member, which is fixed to the lever 3, and a shaft member 25 as a second shaft member which is turnably held by the shaft member 24. In FIGS. 7 through 9, the "X" direction is the first direction, the "Y" direction is the second direction, and the "Z" direction is a length direction of the arm 12.

The shaft member 24 is fixed to a tip end portion of the lever 3. Both end sides of the shaft member 24 are protruded to outer sides in the first direction with respect to the lever 3. The second joint part 15 is disposed on both sides of the tip end portion of lever 3 in the first direction. The two second joint parts 15 disposed on both sides of the tip end portion of the lever 3 are symmetrically disposed with respect to the lever 3. As shown in FIG. 8, two ball bearings 22 are disposed in a separated state with a predetermined space therebetween in the first direction, and inner rings 22a of two ball bearings 22 are fixed to an outer peripheral face of an end part of the shaft member 24. A snap ring 26 is fixed to the shaft member 24 on an outer side with respect to the ball bearing 22 in the first direction.

The shaft member 25 is, as shown in FIG. 9(B), provided with a bearing holding part 25a which holds the ball bearing 22 and a cylindrical shaft part 25b which is protruded from the bearing holding part 25a to both sides in the second direction. The bearing holding part 25a is formed with a circular through-hole 25c (see FIG. 8) penetrating in the first direction. An outer ring 22b of the ball bearing 22 is fixed to an inner peripheral face of the through-hole 25c. Two ball bearings 23 respectively support two shaft parts 25b. An inner ring 23a of the ball bearing 23 is fixed to an outer peripheral face of the shaft part 25b.

The arm 12 is, as described above, structured of an arm main body 13 and arm end parts 14. The arm end part 14 is, as shown in FIG. 9(B), provided with two fixing plates 27 to which outer rings 23b of the ball bearings 23 are fixed and a fixing block 28 to which the fixing plates 27 are fixed. The fixing plate 27 and the fixing block 28 are formed of aluminum alloy. The fixing block 28 is fixed to an end part of the arm main body 13. The two fixing plates 27 are fixed to the fixing block 28 from outer sides in the second direction so as to sandwich the bearing holding part 25a of the shaft member 25. The fixing plate 27 is formed with a circular through-hole 27a (see FIG. 8) which penetrates in the second direction and an outer ring 23b of the ball bearing 23 is fixed to an inner peripheral face of the through-hole 27a.

A plurality of disc springs 30 as a first urging member is disposed between the ball bearing 22 disposed on the outer side in the first direction of the two ball bearings 22 and the snap ring 26. A plurality of the disc springs 30 is disposed so as to overlap with each other in the first direction. The disc spring 30 which is disposed on the innermost side in the first direction is contacted with the inner ring 22a of the ball bearing 22 to urge the inner ring 22a of the ball bearing 22 toward the inner side in the first direction. The disc springs 30 function to prevent rattling between the inner ring 22a and the outer ring 22b of the ball bearing 22.

A plurality of disc springs 31 as a second urging member is, as shown in FIG. 8, disposed between one of the ball bearings 23 and one side face of the bearing holding part 25a in the second direction. A plurality of the disc springs 31 is disposed so as to overlap with each other in the second direction. The disc spring 31 which is disposed on the outermost side in the second direction is contacted with the inner ring 23a of the ball bearing 23. Further, the other side face of the bearing holding part 25a in the second direction is formed with a contact part 25d, which is contacted with the inner ring 23a of the other ball bearing 23 of two ball bearings 23, so as to protrude to the other side in the second direction. The disc spring 31 urges the inner ring 23a of one of the ball bearings 23 toward the outer side in the second direction and functions to prevent rattling between the inner ring 23a and the outer ring 23b of the ball bearing 23.

The third joint part 18 is similarly structured to the second joint part 15. Therefore, description regarding a detailed structure of the third joint part 18 is omitted. In FIG. 10, a structure of the third joint part 18 which is common to the structure of the second joint part 15 is described by using the same reference sign. The third joint part 18 includes ball bearings 22 which enable turning of the head unit 5 relative to the arm 12 with the first direction as an axial direction of the turning, ball bearings 23 which enable turning of the head unit 5 relative to the arm 12 with the second direction as an axial direction of the turning, a shaft member 24 which is fixed to the head unit 5, and a shaft member 25 which is turnably held by the shaft member 24. Further, in the third joint part 18, the shaft member 24 is fixed to a unit main body 16 and both end sides of the shaft member 24 are protruded to outer sides in the first direction with respect to a fixed part of the shaft member 24 to the unit main body 16.

In the third joint part 18, the ball bearing 22 is a third rolling bearing and the ball bearing 23 is a fourth rolling bearing. Further, in the third joint part 18, the shaft member 24 is a third shaft member and the shaft member 25 is a fourth shaft member. Further, in the third joint part 18, the disc spring 30 is a third urging member and the disc spring 31 is a fourth urging member.

(Principal Effects in this Embodiment)

As described above, in the second joint part 15 in this embodiment, the arm 12 is capable of turning relative to the lever 3 by the ball bearing 22 with the first direction as an axial direction of the turning, and the arm 12 is capable of turning relative to the lever 3 by the ball bearing 23 with the second direction as an axial direction of the turning. Further, in the third joint part 18 in this embodiment, the head unit 5 is capable of turning relative to the arm 12 by the ball bearing 22 with the first direction as an axial direction of the turning, and the head unit 5 is capable of turning relative to the arm 12 by the ball bearing 23 with the second direction as an axial direction of the turning. Therefore, in this embodiment, a relative positional accuracy of the head unit 5 relative to the main body part 2 can be secured by using the ball bearings 22 and 23 which are a general-purpose component and whose accuracy such as dimensional accuracy is easily secured. In other words, in this embodiment, a cost of the robot 1 can be reduced while securing the relative positional accuracy of the head unit 5 relative to the main body part 2.

Further, in this embodiment, a tension coil spring is not required to dispose in the second joint part 15 and the third joint part 18 like the industrial robot described in Patent Literature 1 and thus the weights of the second joint part 15 and the third joint part 18 can be reduced. Therefore, in this embodiment, the head unit 5 can be moved at a further high speed. Further, in the industrial robot described in Patent Literature 1, the recessed part of a joint socket and a ball are contacted with each other and thus wears of the joint socket and the ball lead to a problem. However, in this embodiment, the ball bearings 22 and 23 are used and thus the problem does not occur.

In this embodiment, the inner ring 22a of the ball bearing 22 is fixed to the shaft member 24, the outer ring 22b of the ball bearing 22 and the inner ring 23a of the ball bearing 23 are fixed to the shaft member 25, and the outer ring 23b of the ball bearing 23 is fixed to the arm 12. The robot 1 in this embodiment is a parallel link type robot including three levers 3 and three arm parts 4. Therefore, for example, in comparison with a parallel link type robot including four levers and four arm parts, a range of a turning angle of the arm 12 relative to the lever 3 and a range of a turning angle of the head unit 5 relative to the arm 12 become larger. However, in this embodiment, since the ball bearings 22 and 23 and the shaft members 24 and 25 are used, a range of a turning angle of the arm 12 relative to the lever 3 and a range of a turning angle of the head unit 5 relative to the arm 12 can be secured.

In this embodiment, the ball bearing 22 which is a deep groove ball bearing is used as a first rolling bearing which enables turning of the arm 12 relative to the lever 3 with the first direction as an axial direction of the turning, and the ball bearing 23 which is a deep groove ball bearing is used as a second rolling bearing which enables turning of the arm 12 relative to the lever 3 with the second direction as an axial direction of the turning. Further, in this embodiment, the ball bearing 22 is used as a third rolling bearing which enables turning of the head unit 5 relative to the arm 12 with the first direction as an axial direction of the turning, and the ball bearing 23 is used as a fourth rolling bearing which enables turning of the head unit 5 relative to the arm 12 with the second direction as an axial direction of the turning. The deep groove ball bearing is capable of receiving a load in a radial direction and a load in a thrust direction and thus, in this embodiment, two kinds of bearing, i.e., a radial bearing and a thrust bearing are not required to be used as the first through the fourth rolling bearings. Therefore, in this embodiment, the structures of the second joint part 15 and the third joint part 18 are simplified and the size and the weight of the second joint part 15 and the third joint part 18 can be reduced. Further, a cost of the robot 1 can be further reduced.

In this embodiment, the second joint part 15 and the third joint part 18 include a disc spring 30 for preventing rattling between the inner ring 22a and the outer ring 22b of the ball bearing 22, and a disc spring 31 for preventing rattling between the inner ring 23a and the outer ring 23b of the ball bearing 23. Therefore, in this embodiment, rattling between the inner ring 22a and the outer ring 22b of the ball bearing 22, and rattling between the inner ring 23a and the outer ring 23b of the ball bearing 23 are prevented to enhance relative positional accuracy of the head unit 5 relative to the main body part 2.

Further, in this embodiment, rattling between the inner ring 22a and the outer ring 22b of the ball bearing 22 is prevented by the disc spring 30, and rattling between the inner ring 23a and the outer ring 23b of the ball bearing 23 is prevented by the disc spring 31. Therefore, in comparison with a case that rattling between the inner rings 22a and 23a and the outer rings 22b and 23b of the ball bearings 22 and 23 is prevented by a plate spring, a compression coil spring or the like, the sizes of the second joint part 15 and the third joint part 18 can be reduced.

(Other Embodiments)

Although the present invention has been shown and described with reference to a specific embodiment, various changes and modifications will be apparent to those skilled in the art from the teachings herein.

In the embodiment described above, the ball bearings 22 and 23 are a deep groove ball bearing. However, the present invention is not limited to this embodiment. For example, the ball bearings 22 and 23 may be other ball bearings such as an angular ball bearing. Further, a tapered roller bearing may be disposed instead of the ball bearings 22 and 23. In a case that a bearing capable of receiving a load in a radial direction and a load in a thrust direction is used as described above, two kinds of bearing, i.e., a radial bearing and a thrust bearing are not required to be used as the first through the fourth rolling bearings. Therefore, as described above, the structures of the second joint part 15 and the third joint part 18 are simplified and the size and the weight of the second joint part 15 and the third joint part 18 can be reduced. In accordance with an embodiment of the present invention, two kinds of a bearing, i.e., a radial bearing and a thrust bearing may be combined with each other to be used as the first through the fourth rolling bearings.

In the embodiment described above, the disc spring 30 urges the inner ring 22a of the ball bearing 22 toward the first direction. However, the present invention is not limited to this embodiment. For example, the disc spring 30 may urge the outer ring 22b of the ball bearing 22 toward the first direction. Similarly, in the embodiment described above, the disc spring 31 urges the inner ring 23a of the ball bearing 23 toward the second direction. However, the disc spring 31 may urge the outer ring 23b of the ball bearing 23 toward the second direction.

In the embodiment described above, rattling between the inner ring 22a and the outer ring 22b of the ball bearing 22 is prevented by the disc spring 30, and rattling between the inner ring 23a and the outer ring 23b of the ball bearing 23 is prevented by the disc spring 31. However, the present invention is not limited to this embodiment. For example, rattling between the inner rings 22a and 23a and the outer rings 22b and 23b of the ball bearings 22 and 23 may be prevented by a wave washer which is formed by bending a flat washer made of a spring steel plate in a wave shape. Also in this case, in comparison with a case that rattling between the inner rings 22a and 23a and the outer rings 22b and 23b of the ball bearings 22 and 23 are prevented by a plate spring, a compression coil spring or the like, the sizes of the second joint part 15 and the third joint part 18 can be reduced. Further, rattling between the inner rings 22a and 23a and the outer rings 22b and 23b of the ball bearings 22 and 23 may be prevented by other spring members such as a plate spring or a compression coil spring. Alternatively, rattling between the inner rings 22a and 23a and the outer rings 22b and 23b of the ball bearings 22 and 23 may be prevented by an elastic member such as rubber.

In the embodiment described above, in the second joint part 15, the inner ring 22a of the ball bearing 22 is fixed to the shaft member 24, the outer ring 22b of the ball bearing 22 and the inner ring 23a of the ball bearing 23 are fixed to the shaft member 25, and the outer ring 23b of the ball bearing 23 is fixed to the fixing plate 27. However, the present invention is not limited to this embodiment. For example, in the second joint part 15, it may be structured that an inner ring of the ball bearing, which enables turning of the arm 12 relative to the lever 3 with the second direction as an axial direction of the turning, is fixed to the shaft member 24, and an outer ring of its ball bearing is fixed to the shaft member 25, and an inner ring of the ball bearing, which enables turning of the arm 12 relative to the lever 3 with the first direction as an axial direction of the turning, is fixed to the shaft member 25, and an outer ring of its ball bearing is fixed to the fixing plate 27.

Similarly, in the embodiment described above, in the third joint part 18, the inner ring 22a of the ball bearing 22 is fixed to the shaft member 24, the outer ring 22b of the ball bearing 22 and the inner ring 23a of the ball bearing 23 are fixed to the shaft member 25, and the outer ring 23b of the ball bearing 23 is fixed to the fixing plate 27. However, in the third joint part 18, it may be structured that an inner ring of the ball bearing which enables turning of the head unit 5 relative to the arm 12 with the second direction as an axial direction of the turning is fixed to the shaft member 24, an outer ring of its ball bearing is fixed to the shaft member 25, and that an inner ring of the ball bearing which enables turning of the head unit 5 relative to the arm 12 with the first direction as an axial direction of the turning is fixed to the shaft member 25 and an outer ring of its ball bearing is fixed to the fixing plate 27.

In the embodiment described above, the robot 1 includes three levers 3 and three arm parts 4. However, the robot 1 may include four or more levers 3 and four or more arm parts 4. Further, in the embodiment described above, the robot 1 is a robot for conveying a work, but the robot 1 may be an industrial robot such as an assembling robot other than a conveying robot.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

REFERENCE SIGNS LIST 1 robot (industrial robot)
2 main body part
3 lever
4 arm part
5 head unit (movable part)
7 first joint part
8 motor (turning drive mechanism)
12 arm
15 second joint part
18 third joint part
22 ball bearing (first rolling bearing, third rolling bearing)
22a inner ring (inner ring of first rolling bearing, inner ring of third rolling bearing)
22b outer ring (outer ring of first rolling bearing, outer ring of third rolling bearing)
23 ball bearing (second rolling bearing, fourth rolling bearing)
22a inner ring (inner ring of second rolling bearing, inner ring of fourth rolling bearing)
22b outer ring (outer ring of second rolling bearing, outer ring of fourth rolling bearing)
24 shaft member (first shaft member, third shaft member)
25 shaft member (second shaft member, fourth shaft member)
30 disc spring (first urging member, third urging member)
31 disc spring (second urging member, fourth urging member)
"X" (XA, XB, XC) first direction
"Y" second direction
"Z" length direction of arm

The invention claimed is:

1. An industrial robot comprising:
a main body part;
a plurality of levers having base end sides turnably connected with the main body part;
a plurality of arm parts having respective base end sides turnably connected with respective tip end sides of the plurality of the levers;
a movable part which is turnably connected with the respective tip end sides of the plurality of the arm parts; and
a plurality of turning drive mechanisms for respectively turning the plurality of the levers;
wherein the plurality of the levers are connected with the main body part so as to substantially radially extend to an outer peripheral side of the main body part at a pitch of substantially equal angle;
wherein each of the plurality of arm parts are provided with two arms which are mutually parallel to each other and are formed in a straight shape;
wherein respective base end sides of the two arms are turnably connected with the tip end side of the lever and the movable part is turnably connected with tip end sides of the two arms; wherein, in a first joint part which is a connection part of the main body part with the lever, the base end side of the lever is connected with the main body part so that the lever is capable of turning relative to the main body part with a first direction substantially perpendicular to an extending direction of the lever from the main body part as an axial direction of turning;
wherein a second joint part which is a connection part of the lever with the arm includes a first rolling bearing, which enables turning of the arm relative to the lever with the first direction as an axial direction of turning, and a second rolling bearing which enables turning of the arm relative to the lever with a second direction substantially perpendicular to a length direction of the arm and the first direction as an axial direction of turning;

wherein a third joint part which is a connection part of the arm with the movable part includes a third rolling bearing, which enables turning of the movable part relative to the arm with the first direction as an axial direction of turning, and a fourth rolling bearing which enables turning of the movable part relative to the arm with the second direction as an axial direction of turning, wherein the second joint part includes a first shaft member, which is fixed to the lever and to which an inner ring of the first rolling bearing is fixed, and a second shaft member to which an outer ring of the first rolling bearing and an inner ring of the second rolling bearing are fixed, and an outer ring of the second rolling bearing is fixed to the arm; and wherein the second joint part comprises:

a first urging member which urges the inner ring or the outer ring of the first rolling bearing toward an inner side in the first direction to prevent rattling between the inner ring and the outer ring of the first rolling bearing, wherein the first rolling bearing comprises two ball bearings and the first urging member is structured to urge the two ball bearings;

a second urging member which urges the inner ring or the outer ring of the second rolling bearing toward an outer side in the second direction to prevent rattling between the inner ring and the outer ring of the second rolling bearing, wherein the second rolling bearing comprises two ball bearings, and the second urging member is structured to urge the two ball bearings; and wherein the first urging member and the second urging member are a disc spring.

2. The industrial robot according to claim 1, wherein the first rolling bearing, the second rolling bearing, the third rolling bearing and the fourth rolling bearing are a ball bearing.

3. The industrial robot according to claim 1, wherein a number of the levers is three and a number of the arm parts is three.

4. An industrial robot comprising:

a main body part;

a plurality of levers having base end sides turnably connected with the main body part;

a plurality of arm parts having respective base end sides turnably connected with respective tip end sides of the plurality of the levers;

a movable part which is turnably connected with the respective tip end sides of the plurality of the arm parts; and a plurality of turning drive mechanisms for respectively turning the plurality of the levers;

wherein the plurality of the levers is connected with the main body part so as to substantially radially extend to an outer peripheral side of the main body part at a pitch of substantially equal angle;

wherein the arm part is provided with two arms which are mutually parallel to each other and are formed in a straight shape;

wherein respective base end sides of the two arms are turnably connected with the tip end side of the lever and the movable part is turnably connected with tip end sides of the two arms;

wherein, in a first joint part which is a connection part of the main body part with the lever, the base end side of the lever is connected with the main body part so that the lever is capable of turning relative to the main body part with a first direction substantially perpendicular to an extending direction of the lever from the main body part as an axial direction of turning;

wherein a second joint part which is a connection part of the lever with the arm includes a first rolling bearing, which enables turning of the arm relative to the lever with the first direction as an axial direction of turning, and a second rolling bearing which enables turning of the arm relative to the lever with a second direction substantially perpendicular to a length direction of the arm and the first direction as an axial direction of turning;

wherein a third joint part which is a connection part of the arm with the movable part includes a third rolling bearing, which enables turning of the movable part relative to the arm with the first direction as an axial direction of turning, and a fourth rolling bearing which enables turning of the movable part relative to the arm with the second direction as an axial direction of turning, wherein the third joint part includes a third shaft member, which is fixed to the movable part and to which an inner ring of the third rolling bearing is fixed, and a fourth shaft member to which an outer ring of the third rolling bearing and an inner ring of the fourth rolling bearing are fixed, and an outer ring of the fourth rolling bearing is fixed to the arm, wherein the third joint part comprises:

a third urging member which urges the inner ring or the outer ring of the third rolling bearing toward an inner side in the first direction to prevent rattling between the inner ring and the outer ring of the third rolling bearing, wherein the third rolling bearing comprises two ball bearings, and the third urging member is structured to urge the two ball bearings;

a fourth urging member which urges the inner ring or the outer ring of the fourth rolling bearing toward an outer side in the second direction to prevent rattling between the inner ring and the outer ring of the fourth rolling bearing, wherein the fourth rolling bearing comprises two ball bearings, and the fourth urging member is structured to urge the two ball bearings; and wherein the third urging member and the fourth urging member are a disc spring.

5. The industrial robot according to claim 4, wherein the third urging member and the fourth urging member are a disc spring.

* * * * *